(12) United States Patent
Buck, Jr.

(10) Patent No.: US 11,656,411 B2
(45) Date of Patent: May 23, 2023

(54) MONOLITHIC FIBER-LENS ARRAY FOR COMMUNICATION AND REMOTE SENSING

(71) Applicant: LOCKHEED MARTIN CORPORATION, Bethesda, MD (US)

(72) Inventor: Joseph Robert Buck, Jr., Superior, CO (US)

(73) Assignee: LOCKHEED MARTIN CORPORATION, Bethesda, MD (US)

( * ) Notice: Subject to any disclaimer, the term of this patent is extended or adjusted under 35 U.S.C. 154(b) by 0 days.

(21) Appl. No.: 17/669,314

(22) Filed: Feb. 10, 2022

(65) Prior Publication Data

US 2022/0163727 A1 May 26, 2022

Related U.S. Application Data

(62) Division of application No. 16/911,335, filed on Jun. 24, 2020, now Pat. No. 11,275,214.

(51) Int. Cl.
| | |
|---|---|
| *G02B 6/32* | (2006.01) |
| *G02B 6/36* | (2006.01) |
| *G02B 6/38* | (2006.01) |
| *G02B 6/42* | (2006.01) |
| *G02B 6/12* | (2006.01) |

(52) U.S. Cl.
CPC ............. *G02B 6/32* (2013.01); *G02B 6/3644* (2013.01); *G02B 6/327* (2013.01); *G02B 6/3652* (2013.01); *G02B 6/3664* (2013.01); *G02B 6/3839* (2013.01); *G02B 6/4204* (2013.01); *G02B 2006/12102* (2013.01)

(58) Field of Classification Search
CPC ........ G02B 6/32; G02B 6/327; G02B 6/3624; G02B 6/3644; G02B 6/3652; G02B 6/3664; G02B 6/3839; G02B 6/4204; G02B 2006/12102
See application file for complete search history.

(56) References Cited

U.S. PATENT DOCUMENTS

| | | | |
|---|---|---|---|
| 6,587,618 B2 * | 7/2003 | Raguin | G02B 6/322 |
| | | | 385/80 |
| 7,218,811 B2 * | 5/2007 | Shigenaga | G02B 6/3885 |
| | | | 385/39 |
| 8,406,588 B2 | 3/2013 | Matsui | |
| 8,503,840 B2 * | 8/2013 | Hu | B23K 26/32 |
| | | | 385/38 |
| 9,025,917 B2 | 5/2015 | Aoki | |
| 10,139,576 B2 * | 11/2018 | Lueckemeier | G02B 6/3838 |
| 10,222,559 B2 * | 3/2019 | Nakama | G02B 6/32 |
| 2003/0231831 A1 | 12/2003 | Yamamoto et al. | |
| 2006/0198576 A1 | 9/2006 | Furusawa et al. | |
| 2006/0245694 A1 | 11/2006 | Chen | |
| 2007/0189659 A1 | 8/2007 | Shau | |

OTHER PUBLICATIONS

International Search Report dated Nov. 10, 2021 in International Application No. PCT/US2021/038590.

\* cited by examiner

*Primary Examiner* — Ryan A Lepisto
(74) *Attorney, Agent, or Firm* — BarkerHostetler (57) ABSTRACT

A monolithic fiber-lens array includes a number of optical fibers integrated into a fiber block and multiple lens elements integrated into a lens block. The fiber block is coupled to the lens block via a transparent adhesive layer, and the tips of the optical fibers are aligned with respective focal points of the lens elements.

8 Claims, 7 Drawing Sheets

MONOLITHIC FIBER-LENS ARRAY FOR COMMUNICATION AND REMOTE SENSING

CROSS-REFERENCE TO RELATED APPLICATIONS

This application is a divisional of application Ser. No. 16/911,335, filed on Jun. 24, 2020, the entirety of which is incorporated herein by reference for all purposes.

STATEMENT REGARDING FEDERALLY SPONSORED RESEARCH OR DEVELOPMENT

Not applicable.

FIELD OF THE INVENTION

The present invention generally relates to optical systems and, more particularly, to a monolithic fiber-lens array for communication and remote sensing.

BACKGROUND

Active optical systems used in a vast number of application, including optical communication and remote sensing, may include fiber-lens arrays or single aperture optics. The fiber-lens arrays have advantageous features over single aperture optics, which have poor atmospheric performance and large volume, in the sense that the fiber-lens arrays can have improved atmospheric performance with corrections and are more compact. The existing fiber-lens arrays, however, are difficult to assemble, as the fibers and lenses of an array require individual alignments.

Part of the design trade for active optical systems involves the impact of backscatter from the primary optics into the receiver as a background. Anti-reflection coatings may be insufficient for reducing this background. For example, for coherent systems, the primary optic backscatter may set the recovery time for the earliest recoverable range bin. For direct-detection systems, the backscatter may also impact the recoverable range bins. For Geiger-mode receivers, the primary optic backscatter may make many measurement protocols impractical. The primary optic backscatter often drives the use of a bistatic off-axis reflector design.

SUMMARY

According to various aspects of the subject technology, methods and configurations are provided for development of monolithic fiber-lens arrays for communication and remote sensing. The monolithic nature of the disclosed fiber-lens array, with a high (e.g., >99%) fill factor, allows survival in temperature cycling and shock environments. The fiber-lens array of the subject technology incorporates individual fiber pointing corrections in a monolithic block including a lens block that is cured to a fiber array block in a simple, one-step assembly.

In one or more aspects, a monolithic fiber-lens array includes a number of optical fibers integrated into a fiber block and multiple lens elements integrated into a lens block. The fiber block is coupled to the lens block via a transparent adhesive layer, and the tips of the optical fibers are aligned with respective focal points of the lens elements.

In other aspects, an off-axis, fiber-array collimator includes a monolithic fiber block including a plurality of optical fibers and a reflector optically coupled to the monolithic fiber block. The reflector is coupled to the monolithic fiber block via a transparent adhesive layer. The reflector axis of the reflector is at an angle with respect to the beam axis of a beam of the optical fibers.

In yet other aspects, a method of providing a monolithic fiber-lens array includes fabricating a fiber block, including a number of optical fibers, and fabricating a lens block including multiple thin-film lenses. The method further includes coupling the fiber block to the lens block by using a transparent adhesive layer and aligning tips of the optical fibers with respective focal points of the thin-film lenses.

The foregoing has outlined rather broadly the features of the present disclosure so that the following detailed description can be better understood. Additional features and advantages of the disclosure, which form the subject of the claims, will be described hereinafter.

BRIEF DESCRIPTION OF THE DRAWINGS

For a more complete understanding of the present disclosure and the advantages thereof, reference is now made to the following descriptions to be taken in conjunction with the accompanying drawings describing specific aspects of the disclosure, wherein.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and can be practiced using one or more implementations. In one or more instances, well-known structures and components are shown in block diagram form in order to avoid obscuring the concepts of the subject technology.

In some aspects of the present technology, methods and configurations are provided for development of a monolithic fiber-lens array for communication and remote sensing. The fiber-lens array of the subject technology incorporates individual fiber pointing corrections in a monolithic block including a lens block that is cured to a fiber-array block in a simple, one-step assembly. The monolithic nature of the disclosed fiber-lens array, with a high (e.g., >99%) fill factor, allows survival in temperature cycling and shock environments. The subject technology allows precision correction of pointing errors in fiber block assembly and reduces tolerances on fiber array. The lens arrays of the subject technology include off-axis parabolic lens arrays to reduce backscatter from the primary optics into the receiver as a background. The designs of the subject technology can be optimized for different operating points and sizes. Further, the disclosed solution allows sizing based on turbulence to optimize corrections and can include designs that incorporate wedges to reduce backscatter.

The existing lens arrays require individual assembly with tip-tilt control for each fiber lens of the array, which makes the assembly time and labor intensive. Further, the existing lens arrays include many parts, which limits robustness to thermal and shock environments. In addition, the existing solutions have a limited fill factor and their assembly limitations place additional constraints on the fiber array blocks. Typically, the assembly techniques include epoxies, soldering and optical contact, which may involve complex sheer and strain impacts as the assembly proceeds. The subject technology remedies the deficiencies of the existing solutions and provides a robust monolithic fiber-lens array.

Figure 1A:
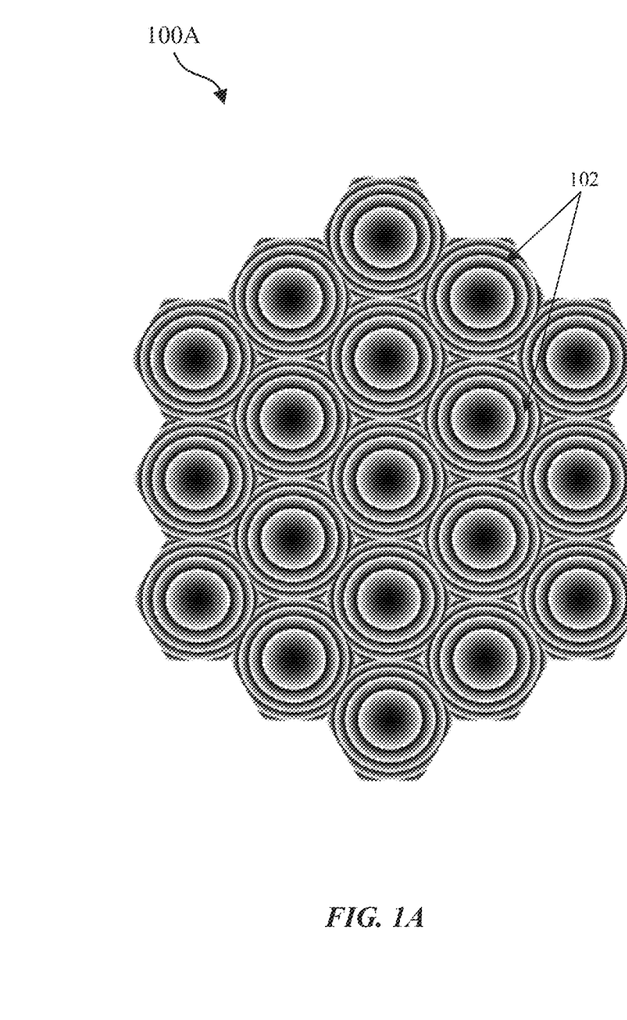
FIGS. 1A and 1B are schematic diagrams illustrating examples of a phase profile for a thin-film lens-array pattern and a corresponding fiber-lens array, according to certain aspects of the disclosure.
Figure 1B:
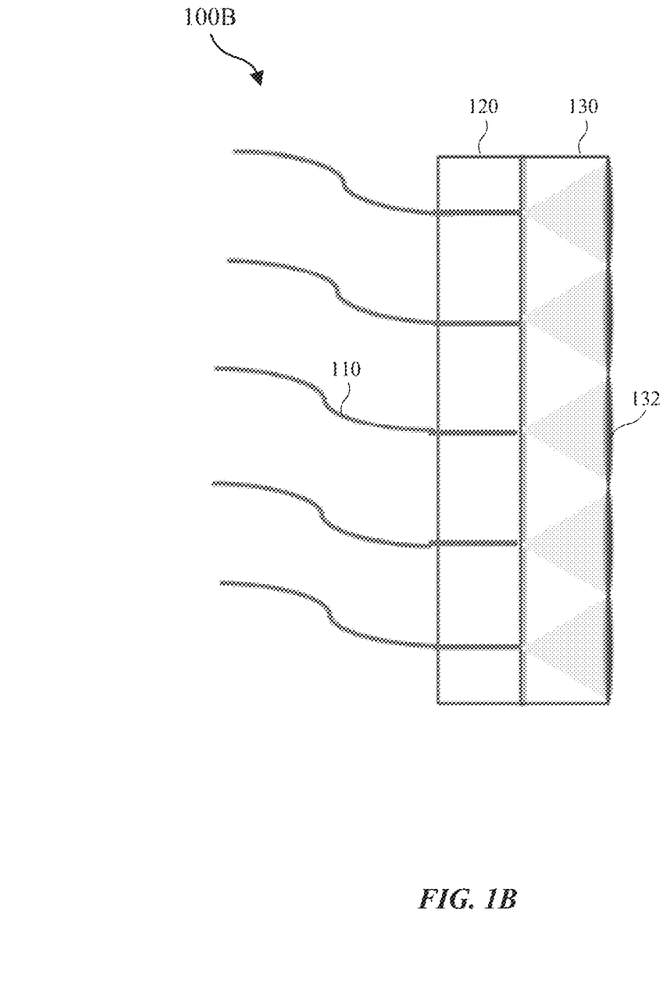

FIGS. 1A and 1B are schematic diagrams illustrating examples of a phase profile 100A for a thin-film lens-array pattern and a corresponding fiber-lens array 100B, according to certain aspects of the disclosure. The phase profile 100A is associated with a thin-film lens-array pattern and is observed with a crossed polarizer. For the phase profile 100A, the corresponding lens elements are hexagonal and are closely packed in a hexagonal configuration. The focal length of the lenses of the thin-film lens array can be defined by the pattern gradient 102. The phase profile 100A is represented by a wrapping of $2\pi$ radians in the plot.

FIG. 1B shows a side view of the fiber-lens array 100B that includes a fiber block 120 and a lens block 130. The fiber block 120 is formed of an array of fibers 110 in a first substrate and the lens block 130 is formed of an array of thin-film lens element 132 formed on a second substrate. The thickness of the second substrate matches the focal length of the thin-film lens elements 132. The location of the fibers 110 in the fiber block 120 precisely matches the location of the focal points of the thin-film lens elements 132 on the lens block 130, so the fiber block 120 can be adhered to the lens block 130 to form a collimated array matched to the fiber array. The effective f-number (ratio of the focal length to the aperture diameter) of the thin-film lens elements 132 permits a much lower volume for the lens block 130, compared to using a single larger lens with a single fiber.

In some implementations, the individual thin-film lens elements 132 of the lens block 130 can be made to operate with high spatial efficiency (e.g., fill factor >99.9%) down to a diameter of about 10 μm with focal lengths down to about 10 μm. The lens-array pattern can be chosen to cover lens arrays of arbitrary sizes. In one or more implementations, the first and second substrates can be made of a transparent polymer, for example, plexiglass.

Figure 2:
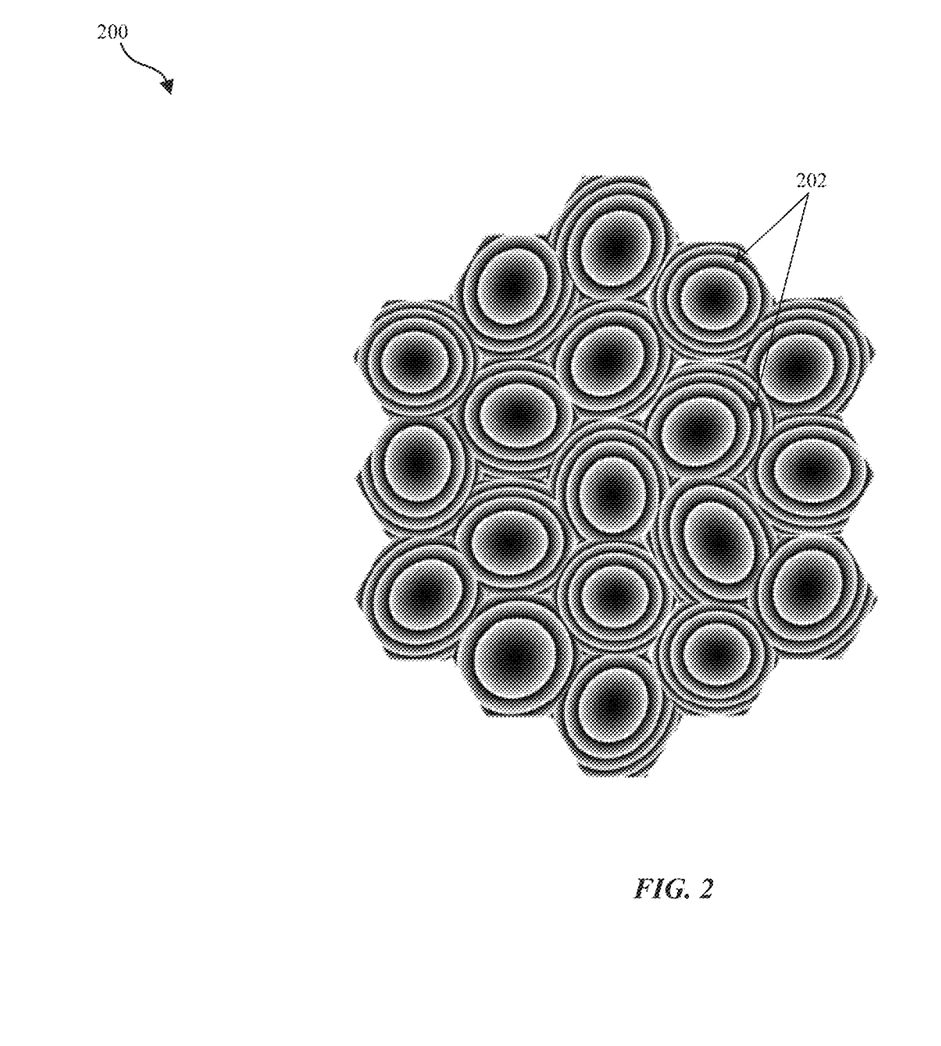
FIG. 2 is a schematic diagram illustrating an example of a phase profile for a thin-film lens-array pattern with offset and pointing correction for an imperfect fiber array, according to certain aspects of the disclosure.

FIG. 2 is a schematic diagram illustrating an example of a phase profile 200 for a thin-film lens array pattern with offset and pointing correction for an imperfect fiber array, according to certain aspects of the disclosure. The phase profile 200 is associated with a thin-film lens-array pattern and is observed with a crossed polarizer. For the phase profile 200, the corresponding lens elements are hexagonal and are closely packed in a hexagonal configuration, but are not precisely matched with the focal points of the fibers of the imperfect fiber array, thus have offsets and pointing corrections with respect to the fibers. The focal length of the lenses of the thin-film lens array can be defined by the pattern gradient 202. The phase profile 200 is represented by a wrapping of $2\pi$ radians in the plot.

Figure 3A:
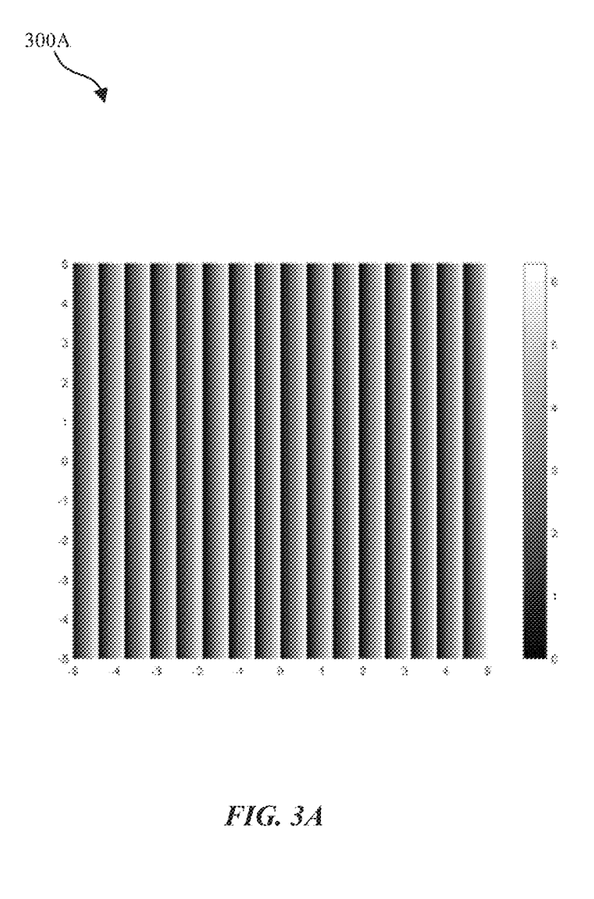
FIGS. 3A and 3B are schematic diagrams of a phase profile for a uniform deflection angle in a thin-film optic and a fiber-lens array with deflection, according to certain aspects of the disclosure.
Figure 3B:
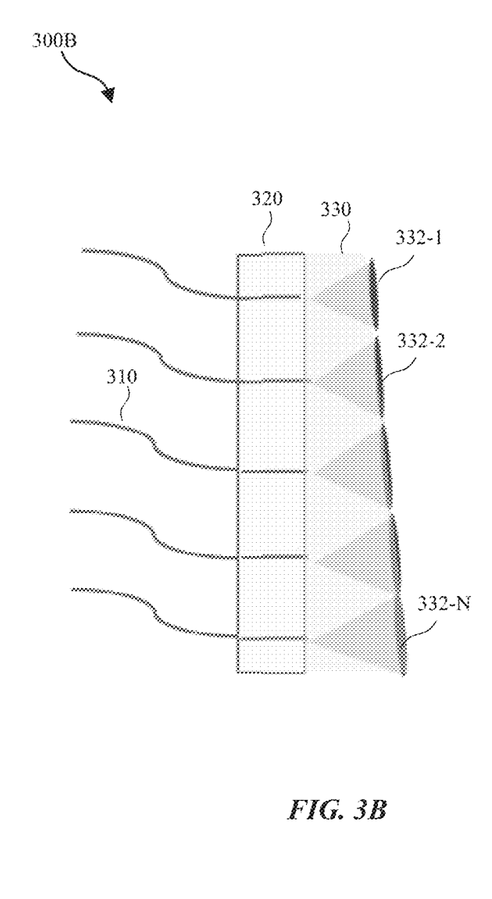

FIGS. 3A and 3B are schematic diagrams of a phase profile 300A for a uniform deflection angle in a thin film optics and a fiber-lens array 300B with deflection, according to certain aspects of the disclosure. The phase profile 300A of FIG. 3A is associated with a thin-film optic having a uniform deflection angle. The phase profile 300A is represented by a wrapping of $2\pi$ radians. The deflection angle can be realized in a reflective or transmissive thin-film optic to reduce the backscatter back into the fiber.

FIG. 3B shows a side view of the fiber-lens array 300B that includes a fiber block 320 and a lens block 330. The fiber block 320 is formed from an array of fibers 310 in a flat substrate and the lens block 330 is formed of an array of thin-film lens element 332 (e.g., 332-1, 332-2, ... 332-N) formed on a wedged substrate. In fiber-lens array 300B, the lens profile of each thin-film lens element 332 accounts for the changing path length across the wedge. For example, the focal lengths of the lens arrays 332-1, 332-2, ... 332-N changes according to the respective thickness across the wedged substrate. The location of the fibers 310 in the fiber block 320 precisely matches the location of the focal points of the thin-film lens elements 332 on the lens block 330, so the fiber block 320 can be adhered to the lens block 330 to form a collimated array matched to the fiber array. The effective f-number of the thin-film lens elements 332 permits a much lower volume for the lens block 330 as compared to using a single larger lens with a single fiber. The wedge shape of the wedged substrate reduces backscattered light returning into the fibers 310.

Figure 4A:
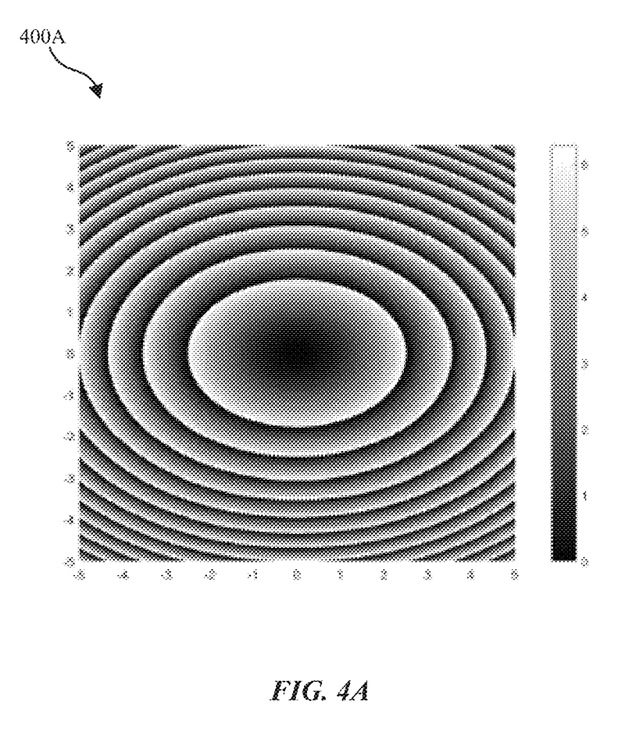
FIGS. 4A and 4B are schematic diagrams illustrating an example of a combined phase profile and an example implementation of a collimator using a fiber-lens array and a reflector, according to certain aspects of the disclosure.
Figure 4B:
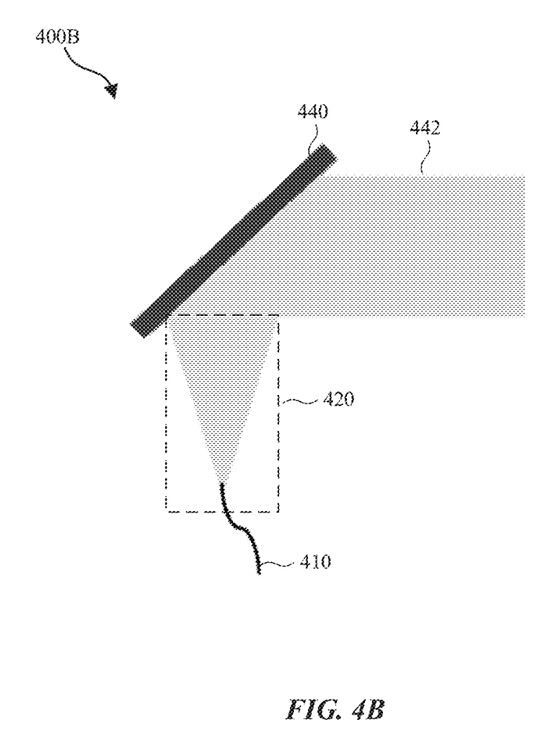

FIGS. 4A and 4B are schematic diagrams illustrating examples of a combined phase profile 400A and an implementation of a collimator 400B using a fiber block and a reflector, according to certain aspects of the disclosure. The combined phase profile 400A is associated with the collimator 400B that combines a lens profile and a deflection to provide an off-axis beam.

FIG. 4B shows a cross-sectional view of the collimator 400B that is implemented by combining a fiber block 420 and a reflector 440. In the cross-sectional view, the fiber block 420 is represented by a single fiber that is combined with the reflector 440. In one or more implementations, the fiber block 420 can be a fiber array, for example, a linear fiber array, that extends into the plane of FIG. 4B. In some implementations, the reflector 440 is an off-axis parabolic reflector that functions as a collimator for the fiber block 420. The reflector 440 provides the collimated beam 442 and reduces backscattered light into the fiber 410. In some implementations, the reflector 440 is an array of thin-film reflectors integrated into a monolithic reflector block.

Figure 5:
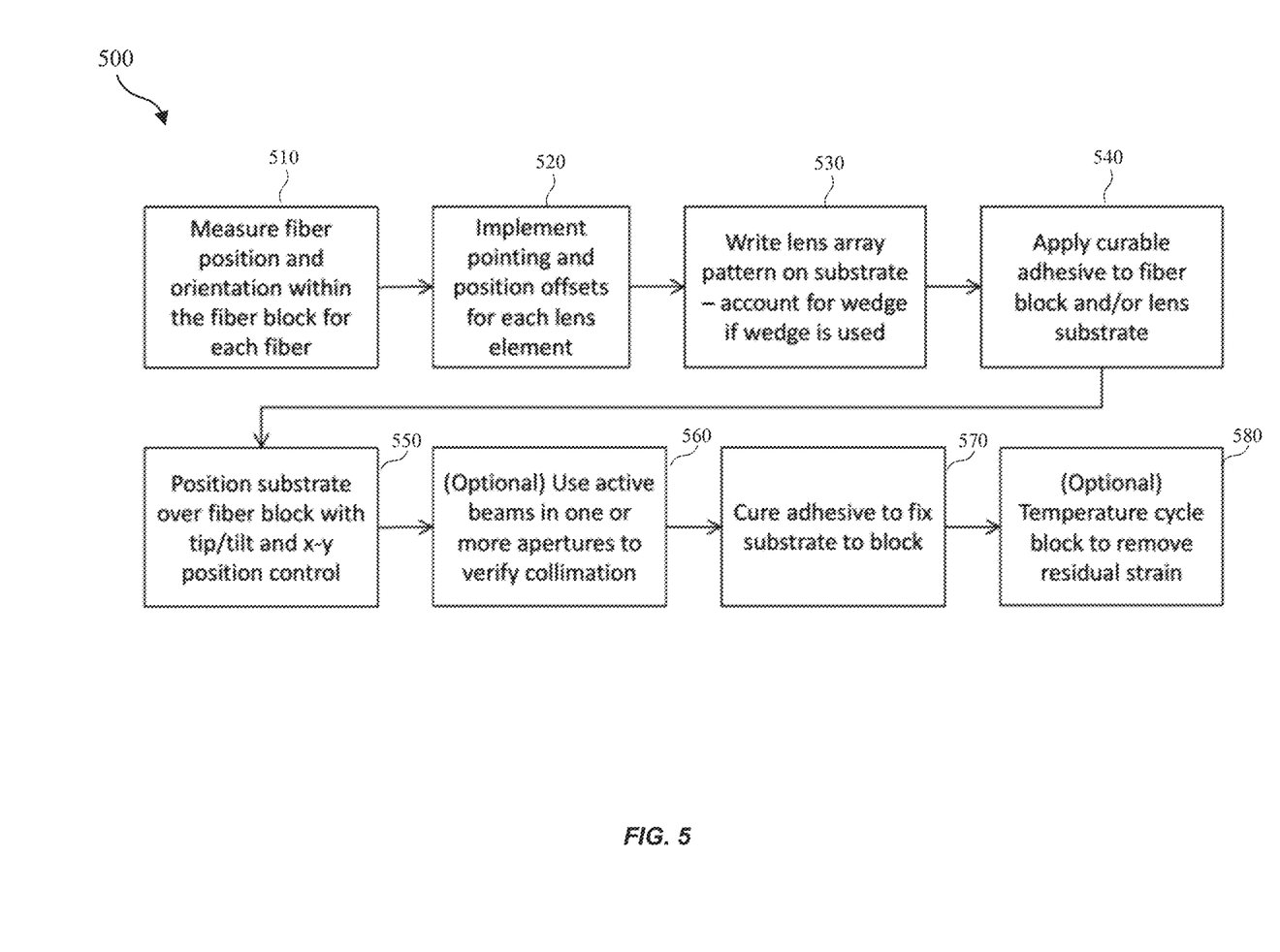
FIG. 5 is a flow diagram illustrating an example of a design process for a monolithic lens array with and without wedge in a block, according to certain aspects of the disclosure.

FIG. 5 is a flow diagram illustrating an example of a design process 500 for a monolithic lens array with and without wedge in a block, according to certain aspects of the disclosure. The design process 500 shows the process for implementing a corrected fiber array into a monolithic fiber block. The design process 500 starts at operation block 510, where the fiber position and orientation for each fiber (e.g., 110 of FIG. 1B or 310 of FIG. 3B) within the fiber block (e.g., 120 of FIG. 1B or 320 of FIG. 3B) is measured. The fiber positions and pointing can be determined in one of several ways, including active and passive imaging methods, measuring light exiting individual fibers, or from measuring interference with light from multiple fibers or other overlapped sources. The measurements provide the basis of required lens profiles to correct for the offsets. At operation block 520, pointing and position offsets for each lens element (e.g., 132 of FIG. 1B or 332 of FIG. 3B) is implemented. At operation block 530, the lens-array pattern is written on the substrate. In case a wedge substrate is used, as in FIG. 3B, the wedge shape of the substrate should be taken into account. Additional changes include applying corrections for the profile of the substrate, for example, surface irregularities of the substrates. At operation block 540, a curable adhesive is applied to the fiber block and/or the lens block. There are many options for adhering the lens block to the fiber blocks including UV-cured adhesive, optical contacting, laser welding with or without interfaces, and mechanical holding methods. At operation block 550, the lens and fiber blocks are positioned, using mechanical stages with tip and/or tilt control and X-Y position control, during the adherence phase. At operation block 560, active feedback using active beams is used in one or more apertures to account for curing offsets and to verify collimation. At operation block 570, the adhesive is cures to fix the substrate to the block. At operation block 580, additional device treatments, including thermal cycling, are used to remove residual stresses in the coupling.

The designs of the subject technology are optimized for remote sensing to optimize performance and minimize overall mass. The tradeoffs include sub-system mass and power handling balanced with the fiber block mass and size. In cases where atmospheric turbulence is not an issue, the constraints of the final aperture typically set the sizing requirements. The required f-number and depth constraints determine the number of elements required to achieve those metrics.

Further, the disclosed designs are optimized for optical communication in the atmosphere. In this case, when the individual element power handling is not the driving metric, the system is designed to have a lens element slightly smaller than the atmospheric cell size. At that point, the first order atmospheric correction to mitigate turbulence is a piston phase term that can be implemented in each channel with a phase controller. The piston phase term is the mean value of a phase profile across the pupil of the optical system. The benefits of the scaled aperture then allow performance scaling with the number of apertures, when the single equivalently larger aperture would have an efficiency limited to the atmospheric cell size.

The designs of the subject technology are also optimized for optical communication with no atmosphere. The tradeoffs include sub-system mass and power handling balanced with the fiber block mass and size. In the cases where atmospheric turbulence is not an issue, the constraints of the final aperture typically set the sizing requirements. The required f-number and depth constraints determine the number of elements required to achieve those metrics. Additional optimizations include adjusting lens profiles to have a mixture of transmit-only, receive-only, and transmit-receive apertures interleaved in different configurations.

Figure 6:
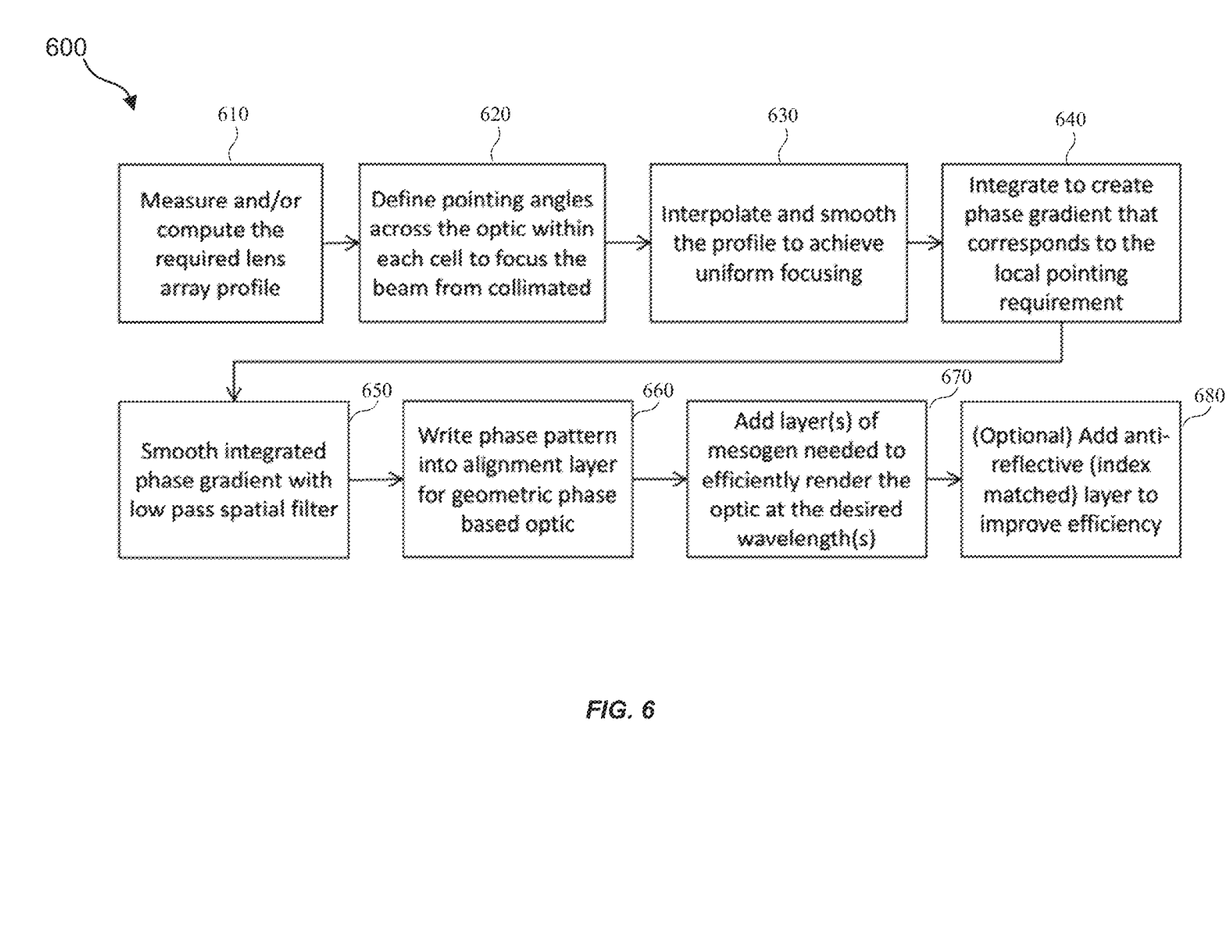
FIG. 6 is a flow diagram illustrating an example of a process for fiber pointing correction measurement and implementation, according to certain aspects of the disclosure.

FIG. 6 is a flow diagram illustrating an example of a process 600 for fiber pointing correction measurement and implementation, according to certain aspects of the disclosure. The process 600 is a process for making the geometric phase-based lens array. The process 600 starts at operation block 610, where the required lens array profile is either computed or measured. At operation block 620, the measured or computed lens array profile are used to make a pattern of pointing angles across the optics within each cell to focus the beam from collimator. At operation block 630, the pattern of pointing angles is interpolated and smoothed with spatial filters to create the required lens profile to achieve uniform focusing. At operation block 640, the interpolated and smoothed patterns are integrated to create the phase gradient that provides the pointing control. At operation block 650, the integrated interpolated and smoothed patterns are then smoothed using a low-pass spatial filter. At operation block 660, the final pattern is then written into an alignment layer for geometric phase-based optics. At operation block 670, mesogen layer(s) are added to the alignment layer, annealed, and cured. Finally, at operation block 680, an anti-reflective, index-matching layer is added to improve efficiency.

Figure 7:
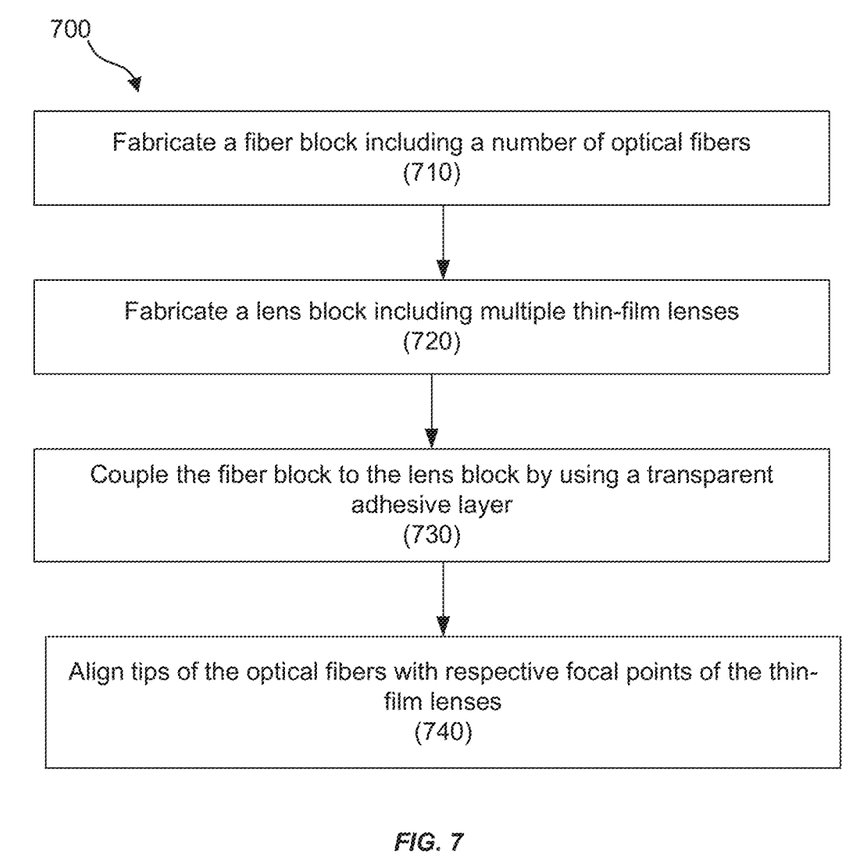
FIG. 7 is a flow diagram illustrating a method of providing a monolithic fiber-lens array, according to certain aspects of the disclosure.

FIG. 7 is a flow diagram illustrating a method 700 of providing a monolithic fiber-lens array (e.g., 100B of FIG. 1B or 300B of FIG. 3B), according to certain aspects of the disclosure. The method 700 includes fabricating a fiber block (e.g., 120 of FIG. 1B or 320 of FIG. 3B), including a number of optical fibers (e.g., 110 of FIG. 1B or 310 of FIG. 3B) (710). The method 700 further includes fabricating a lens block (e.g., 130 of FIG. 1B or 330 of FIG. 3B), including multiple thin-film lenses (e.g., 132 of FIG. 1B or 332 of FIG. 3B) (720). The method further includes coupling the fiber block to the lens block by using a transparent adhesive layer (730) and aligning the tips of the optical fibers with respective focal points of the thin-film lenses (740).

In some aspects, the subject technology is related to methods and configurations for development of a monolithic fiber-lens array for communication and remote sensing. In some other aspects, the subject technology may be used in various markets, including, for example, and without limitation, communication systems and remote-sensing markets.

Those of skill in the art would appreciate that the various illustrative blocks, modules, elements, components, methods, and algorithms described herein may be implemented as electronic hardware, computer software or a combination of both. To illustrate this interchangeability of hardware and software, various illustrative blocks, modules, elements, components, methods, and algorithms have been described above, generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order or partitioned in a different way), all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks may be performed. Any of the blocks may be performed simultaneously. In one or more implementations, multitasking and parallel processing may be advantageous. Moreover, the separation of various system components in the embodiments described above should not be understood as requiring such separation in all embodiments, and it should be understood that the described program components and systems can generally be integrated together in a single hardware and software product or packaged into multiple hardware and software products.

The description of the subject technology is provided to enable any person skilled in the art to practice the various aspects described herein. While the subject technology has been particularly described with reference to the various figures and aspects, it should be understood that these are for illustration purposes only and should not be taken as limiting the scope of the subject technology.

A reference to an element in the singular is not intended to mean "one and only one" unless specifically stated, but rather "one or more." The term "some" refers to one or more. All structural and functional equivalents to the elements of the various aspects described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

Although the invention has been described with reference to the disclosed aspects, one having ordinary skill in the art will readily appreciate that these aspects are only illustrative of the invention. It should be understood that various modifications can be made without departing from the spirit of the invention. The particular aspects disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative aspects disclosed above may be altered, combined, or modified and all such variations are considered within the scope and spirit of the present invention. While compositions and methods are described in terms of "comprising," "containing," or "including" various components or steps, the compositions and methods can also "consist essentially of" or "consist of" the various components and operations. All numbers and ranges disclosed above can vary by some amount. Whenever a numerical range with a lower limit and an upper limit is disclosed, any number and any subrange falling within the broader range are specifically disclosed. Also, the terms in the claims have their plain, ordinary meanings unless otherwise explicitly and clearly defined by the patentee. If there is any conflict in the usage of a word or term in this specification and one or more patent or other documents that may be incorporated herein by reference, the definition that is consistent with this specification should be adopted.

What is claimed is:

1. An off-axis, fiber-array collimator, the collimator comprising:
    a monolithic fiber block including a plurality of optical fibers, wherein the monolithic fiber block comprises a substrate having a first surface configured to include tips of the plurality of optical fibers in a first position configuration; and
    a reflector optically coupled to the monolithic fiber block, the reflector comprising a monolithic reflector block including a plurality of thin-film parabolic reflectors, wherein positions of centers of the plurality of parabolic thin-film reflectors match the first position configuration,
    wherein:
    the reflector is coupled to the monolithic fiber block via a transparent adhesive layer, and
    a reflector axis of the reflector is at an angle with respect to a beam axis of a beam of the plurality of optical fibers, and an axis of each of the parabolic thin-film reflectors is at the angle with respect to a beam axis of a respective beam of the plurality of optical fibers.

2. The collimator of claim 1, wherein the monolithic reflector block is coupled to the monolithic fiber block using a transparent adhesive.

3. The collimator of claim 1, wherein the plurality of optical fibers extend out of the fiber block on a side of the fiber block that is opposite the reflector.

4. The collimator of claim 1, wherein each of the plurality of optical fibers extends only partially within the fiber block.

5. The collimator of claim 1, wherein the plurality of optical fibers forms a linear fiber array.

6. The collimator of claim 1, wherein the reflector is arranged to reduce backscatter light into the optical fibers.

7. The collimator of claim 1, wherein the beam of the plurality of optical fibers is a divergent beam within the fiber block, and the reflector is arranged to reflect the beam as a collimated beam.

8. The collimator of claim 1, wherein the transparent adhesive layer comprises a UV-cured adhesive.

* * * * *